UNITED STATES PATENT OFFICE.

THOMAS SHAW, OF NEWARK, NEW JERSEY.

PROCESS OF ALLOYING COPPER WITH ALUMINIUM AND PHOSPHORUS.

SPECIFICATION forming part of Letters Patent No. 306,781, dated October 21, 1884.

Application filed March 13, 1884. (No specimens.)

*To all whom it may concern:*

Be it known that I, THOMAS SHAW, a citizen of the United States, residing in the city of Newark, in the county of Essex and State of New Jersey, have invented certain new and useful Improvements in the Process of Alloying Copper with Aluminium and with Aluminium and Phosphorus, of which the following is a specification.

In the process of alloying copper with aluminium I have found that the use of palm-oil as a flux materially assists the metals in mixing uniformly, and this seems to be owing to some peculiar physical and chemical properties of the palm-oil, and not merely to the well-known action of oils and grease in preventing the oxidation of the surface of molten metals.

I am aware that palm-oil has been used in the process of tinning sheet-iron; but I have never known of its use in connection with the process of forming alloys of copper and other metals. I first melt the copper, and then add the aluminium with the palm-oil. The palm-oil is added in quantity according to the amount of alloy formed—say a few ounces to a hundred pounds of copper. The use of palm-oil enables one to alloy copper with very small percentages of aluminium. This palm-oil flux may also be used in the process of producing an alloy of copper with small percentages of aluminium and phosphorus, for which alloy I have previously made an application for Letters Patent.

Having now fully described my invention, what I claim as new, and desire to secure by Letters Patent, is—

1. A process of alloying copper with aluminium by the use of palm-oil as a flux.

2. A process of alloying copper with aluminium and phosphorus by the use of palm-oil as a flux.

In witness whereof I have hereunto set my hand.

THOMAS SHAW.

Witnesses:
GEORGE H. SONNEBORN,
JOHN R. BENNETT.